United States Patent
Wibbeke et al.

(10) Patent No.: US 8,020,907 B2
(45) Date of Patent: Sep. 20, 2011

(54) BUMPER FOR A MOTOR VEHICLE

(75) Inventors: Michael Wibbeke, Paderborn (DE);
Christian Handing, Langenberg (DE);
Jochen Dörr, Bad Driburg (DE); Ulrich Lütke-Bexten, Pederborn (DE); Michael Roll, Bielefeld (DE)

(73) Assignee: Benteler Automobiltechnik, Paderborn (DE)

( * ) Notice: Subject to any disclaimer, the term of this patent is extended or adjusted under 35 U.S.C. 154(b) by 0 days.

(21) Appl. No.: 12/690,600

(22) Filed: Jan. 20, 2010

(65) Prior Publication Data
US 2010/0194125 A1 Aug. 5, 2010

(30) Foreign Application Priority Data
Jan. 21, 2009 (DE) .......................... 10 2009 005 606

(51) Int. Cl.
B60R 19/34 (2006.01)

(52) U.S. Cl. ........................................ 293/133; 293/155

(58) Field of Classification Search .................. 293/133, 293/155
See application file for complete search history.

(56) References Cited

U.S. PATENT DOCUMENTS

| | | | |
|---|---|---|---|
| 7,290,811 B1 * | 11/2007 | Arns et al. .................... | 293/133 |
| 7,399,013 B2 * | 7/2008 | Lutke-Bexten et al. ...... | 293/102 |
| 2005/0179268 A1 * | 8/2005 | Kollaritsch et al. ........... | 293/133 |
| 2008/0222873 A1 | 9/2008 | Draht | |
| 2009/0026777 A1 * | 1/2009 | Schmid et al. ................ | 293/133 |

FOREIGN PATENT DOCUMENTS

| | | |
|---|---|---|
| DE | 10 2006 013 274 | 9/2007 |
| JP | 2008-24084 * | 2/2008 |
| WO | WO 2007/082714 | 7/2007 |
| WO | WO 2008/125312 | 10/2008 |

* cited by examiner

*Primary Examiner* — Dennis H Pedder
(74) *Attorney, Agent, or Firm* — Henry M. Feiereisen; Uursula B. Day

(57) ABSTRACT

A bumper for a motor vehicle includes a cross member which is disposed transversely to a side rail of a motor vehicle frame. A crash box is incorporated between the cross member and the side rail, with set bolts being provided to join the crash box to the cross member in the absence of prepunching.

13 Claims, 2 Drawing Sheets

BUMPER FOR A MOTOR VEHICLE

CROSS-REFERENCES TO RELATED APPLICATIONS

This application claims the priority of German Patent Application, Serial No. 10 2009 005 606.8, filed Jan. 21, 2009, pursuant to 35 U.S.C. 119(a)-(d), the content of which is incorporated herein by reference in its entirety as if fully set forth herein.

BACKGROUND OF THE INVENTION

The present invention relates, in general, to a bumper of a motor vehicle.

The following discussion of related art is provided to assist the reader in understanding the advantages of the invention, and is not to be construed as an admission that this related art is prior art to this invention.

Bumpers for motor vehicles are typically arranged across the front and rear of a motor vehicle to absorb energy caused by an impact and thus to minimize damage to the actual support structure of the motor vehicle. A bumper typically includes a cross member which can be fixed transversely to the side rails of the motor vehicle frame, with crash boxes being placed in-between. The cross member is provided to deflect the energy, generated in the event of an impact, into the crash boxes which convert the impact energy into deformation work.

A multiplicity of differently arranged bumpers is well-known. Bumpers must meet official regulations as well as the demands established by consumer protection agencies to protect passengers. In addition, insurers have established classification tests (RCAR Research Council for Automobile Repairs, GDV Gesamtverband der Deutschen Versicherungswirtschaft [Association of German Insurers]), which must also be met.

There is increasingly a desire to build bumpers from components that are best suited to one another in order to realize a defined energy absorption. Moreover, there is also increasingly a demand for reducing $CO_2$ emission by providing a lightweight construction when designing vehicles. It is hereby important to effect a good crash behavior while still constructing the bumper lightweight.

Cross members and crash boxes are joined together to date through material union or by using screws, bolts or rivets. When accessibility to the components is from one side, the cross members and crash boxes can be joined together through direct bolting or blind riveting. Common to all these joining techniques is the need for prepunching of holes in the components. This is complex, expensive, and the connection elements are comparably heavy. Another approach, disclosed in international publications WO 2007/082714 A1 or WO 2008/125312 A1, involves the use of nails to join the cross members and crash boxes to one another.

It would be desirable and advantageous to provide an improved bumper to obviate prior art shortcomings and to improve its behavior in the event of a crash while being lightweight and simple in structure and allowing application of various material pair combinations to optimize energy absorption capability.

SUMMARY OF THE INVENTION

According to one aspect of the present invention, a bumper for a motor vehicle includes a cross member disposed transversely to a side rail of a motor vehicle frame, a crash box placed between the cross member and the side rail, and set bolts joining the crash box to the cross member in the absence of prepunching.

The present invention resolves prior art problems by using set bolts to join crash boxes with the cross member. This does not require prepunching of the components because setting of bolts has been surprisingly found to be effective as joining technique for connecting the cross member and the crash boxes. This type of connection is possible, even when accessibility is possible only from one side. The cross member and the crash boxes can be connected by configuring the set bolts like nails which can be driven in at great speed, e.g. by a single or several blows from a bolt setting device. The walls of the cross member and crash box are hereby traversed. As the set bolt is driven in, it displaces material of the components being joined. During penetration, the material of the cross member and crash boxes plasticizes and undergoes a plastic deformation in the joining zone. Driving in the set bolts at high speed causes substantial localized heating of the components due to friction. After setting, i.e. conclusion of the driving-in process, restoring forces of the plastic deformation act on the set bolts. The joining mechanism of the set bolt connection involves friction fit, material union, and form fit.

As a result of the present invention, bumpers and the connection of the cross member with the crash boxes can be realized at short cycle times. Advantageously, the cross member may be made of composites and multilayer connections. Again no prepunching is required and, moreover, the bumper can be made lightweight and the connection exhibits enhanced strength.

To achieve the force-locking and form-fitting connection of the bumper structure, the application of a pulsed bolt setting process is used in which the needle-shaped set bolts are driven in at high speed and on one side through the components to be joined together. As a result of the high bolt speed, even materials, such as e.g. hot-formed, hardened steels or components of magnesium, that are difficult to form, can be connected in room temperature. It is hereby also conceivable to make the crash box of light metal or a light metal alloy, e.g. aluminum, and to make the cross member of hot formed super high strength steel.

According to another advantageous feature of the present invention, the cross member may have sections of different wall thicknesses. In particular, the cross member may be made from a partially rolled metal sheet, a so-called tailor rolled blank. The cross member may, however, also be made from a roll-formed steel sheet, in particular as hollow section in one chamber or multichamber configuration.

According to another advantageous feature of the present invention, the cross member may be made of a high strength hot-formed steel sheet, e.g. with a strength equal to or greater than 1,500 MPa, while the crash box may be made of a high strength aluminum alloy. Such a material pair is especially suitable for connection with set bolts because steel and aluminum cannot or only to a certain extent be welded together.

The cross member may also be made of light metal or a light metal alloy, e.g. high strength aluminum or magnesium alloy. It may also be conceivable to make the cross member of a fiber-reinforced plastic. Especially useful is a connection with set bolts, when components of metal are being combined with components of plastic. Suitably, the connection can be further enhanced by additional gluing.

According to another advantageous feature of the present invention, the crash box may be made of steel materials. The crash box may be an extrusion part or constructed in the shape of a sheet metal shell construction. The latter process may also involve half-shells joined through bolt setting connections.

According to another advantageous feature of the present invention, the cross member and/or the crash box of the bumper may be provided with a surface coating. The individual components may be coated before being joined together. It is also conceivable to provide the finished bumper as a unitary structure with a surface coating. Organic or inorganic coatings, e.g. zinc lamella coating or thermal diffusion coating, may hereby be applied.

The crash box and the cross member may additionally be fixed through gluing. In this way a particularly favorable combination of a glued connection with a mechanical bolt setting connection is possible.

According to another advantageous feature of the present invention, the cross member may have a U-shaped configured shell body, with a face plate closing off the cross member. Brackets may be provided on the cross member for connection to attachment parts of the crash boxes, with the set bolts being shot through the brackets and the attachment parts. The cross member and the face plate may be made of different materials, e.g. of two different steels with varying strengths or a combination of steel and light metal.

According to another advantageous feature of the present invention, the brackets may be constructed to extend from an end face of the cross member in a direction of the crash box, with the attachment part of the crash box being sandwiched between the bracket and a wall portion of the cross member. The set bolts are hereby sized to extend through the bracket, the attachment part, and the wall portion, thereby producing a multilayer connection, in particular three-layer connection. It may hereby be suitable to apply glue between the individual layers of the multilayer connection.

According to another advantageous feature of the present invention, the crash box is provided with a flange on a side-rail-proximal end of the crash boxes. The flanges are also joined by set bolts with the crash boxes without prepunching. In addition, the crash box and the flange may be glued to one another.

In accordance with the present invention, a bumper can be produced in hybrid construction and thus of lightweight construction so that manufacturing costs are reduced because the need for complicated and expensive screw connection is eliminated. The use of set bolts requires only one-sided accessibility. In combination with gluing, different materials with high corrosion potential can be connected with one another in a force-locking and form-fitting matter. Pulsed bolt setting has the benefit of only a slight heat impact of the components. There is no heat developing during the joining process so that the use of components of super high strength steel materials, in particular hot formed steels is advantageously possible. When being connected or joined, no heat impact is encountered as opposed to a welding process. In addition, the use of materials that cannot be welded together, such as light metals, can now be connected or connected with other materials.

The set bolts have a strength which exceeds the one of softer metal sheets. To prevent contact corrosion as a result of electrochemical compatibility of the components to be joined, the set bolts may be made of a material that is more precious than the component to be joined.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
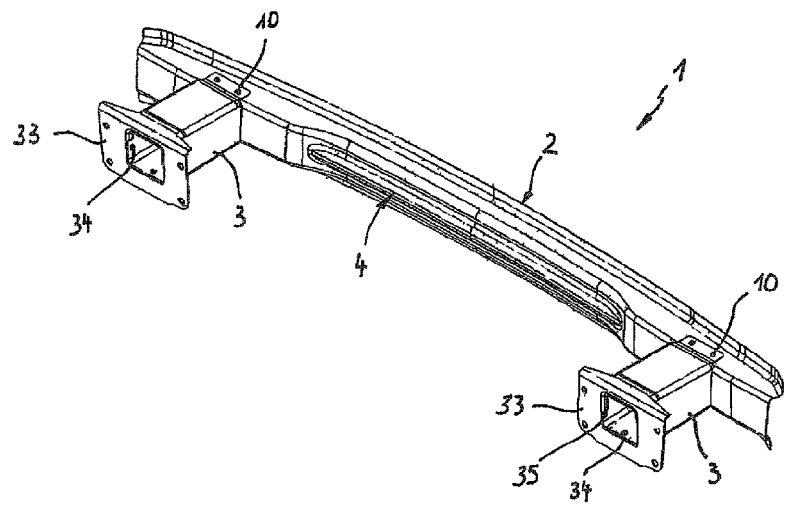
FIG. 1 is a top, rear and side perspective of a bumper according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top, rear and side perspective of a bumper according to the present invention, generally designated by reference numeral 1. The bumper 1 includes a cross member 2 which is disposed transversely to unillustrated side rails of a motor vehicle frame. The cross member 2 is supported on the side rails through intervention of crash boxes 3 which together with the cross member 2 absorb the energy generated in the event of an impact and convert the energy into deformation work.

Figure 2:
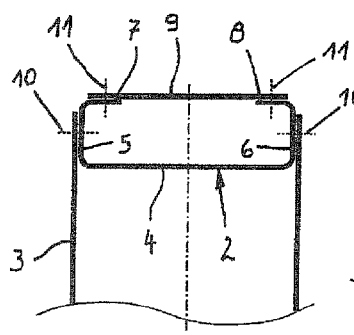
FIG. 2 is a schematic sectional view through one embodiment of a bumper in an area of a crash box.

The cross member 2 is made of metal, e.g. high strength hot rolled steel sheet with a strength equal to or greater than 1,500 MPa, and exhibits a U-shaped cross section with a wall 4 and two legs 5, 6 extending from opposite ends of the wall 4 and followed by front plates 7, 8 which are directed inwardly towards one another. The wall 4 of the cross member 2 is positioned on the vehicle-confronting side of the cross member 2. The cross member 2 is closed off on the front side by a cover or face plate 9, as shown in FIG. 2. FIG. 1 shows the cross member 2 without face plate 9. The crash boxes 3 are made from extrusion parts, in particular a high strength aluminum alloy.

The crash boxes 3 and the cross member 2 are joined together by set bolts 10 without the need for prepunching of holes in the components. The set bolts 10 are hereby driven from one side with a high speed through the wall of the crash boxes 3 and the cross member 2. The pointed set bolts 10 displace hereby the material of the crash box 3 and the cross member 2 in the joining region, causing the plastic deformation. As a result, a stable and very firm connection is realized between the crash boxes 3 and the cross member 2. Furthermore, the face plate 9 is joined to the cross member 2 by set bolts 11 which are driven through the face plate 9 and the front plates 7, 8 of the cross member 2.

As further shown in FIG. 1, the crash boxes 3 are provided on their side-rail-proximal end with flanges 33 which can be made of a same material as the crash boxes 3. Of course, a combination of different materials of the crash boxes 3 and the flanges 33 is conceivable. The flanges 33 are joined to the crash boxes 3 by set bolts 34 without prepunching. The flanges 33 are hereby provided with tabs 35 which are turned in the direction of the crash boxes 3 to engage into the crash boxes 3 or to bear upon the outside. The connection is realized by set bolts 34. In addition, the crash boxes 3 and the flanges 33 can be glued together.

Figure 3:
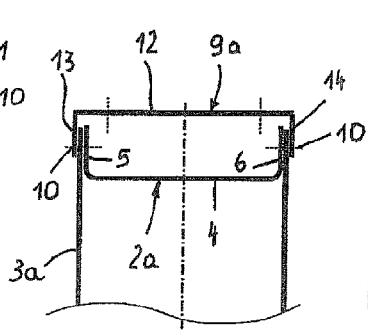
FIG. 3 is a schematic sectional view through another embodiment of a bumper in an area of a crash box.
Figure 4:
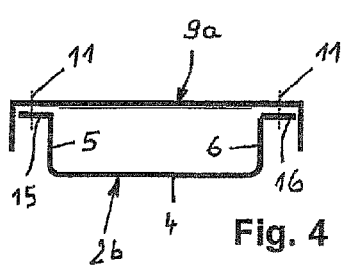
FIG. 4 is a schematic sectional view through yet another embodiment of a bumper in an area of an end of a cross member.

FIGS. 3 and 4 show modified configurations of a cross member 2a, 2b, respectively, and a face plate 9a.

The cross member 2a has a hat-shaped configuration with a wall 4 and two forwardly directed legs 5, 6. The face plate 9a has a U-shaped configuration with a front wall 12 and two side legs 13, 14 directed in the direction of the crash box 3a. Set bolts 10 are used to join the cross member 2a, the crash box 3a, and the face plate 9a. This type of three-layer connection is realized without prepunching the components on one side from outside.

In the illustration of FIG. 4, the cross member 2b has a hat-shaped configuration, wherein the legs 5, 6 are followed by outwardly directed front flanges 15, 16. The face plate 9a and the cross member 2b are joined by set bolts 11 which are driven through the face plate 9a and the front flanges 15, 16 without requiring prepunching of holes.

Figure 5:
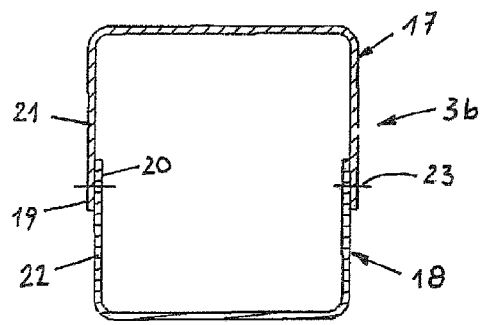
FIG. 5 is a schematic sectional view though a crash box constructed in the shape of a shell construction.

FIG. 5 shows a cross section through a crash box 3b which is produced from two half-shells 17, 18 of sheet metal. Both half-shells 17, 18 overlap in at least some areas thereof along longitudinal edges 19, 20 of their side legs 21, 22 and are joined there by set bolts 23.

Figure 6:
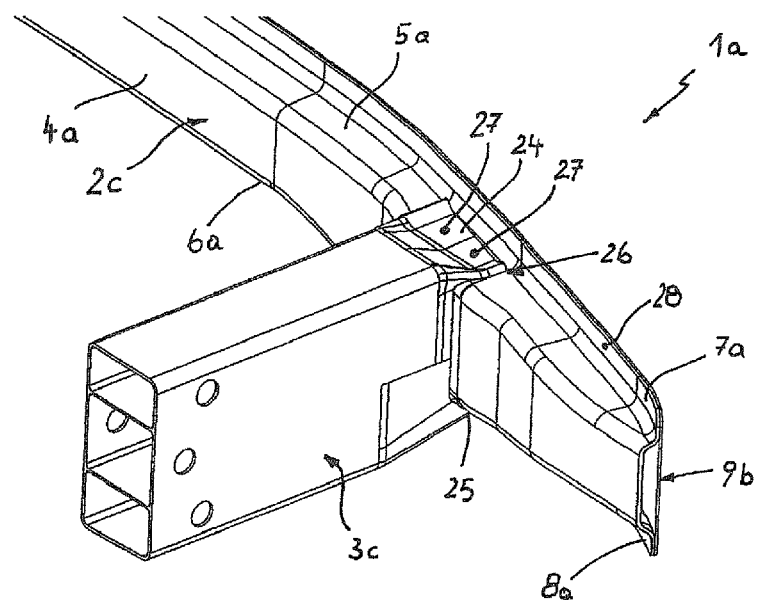
FIG. 6 is a top, rear and side perspective of a detail of another embodiment of a bumper according to the present invention.

A further embodiment of a bumper 1a is illustrated in FIG. 6. The bumper 1a includes a cross member 2c of U-shaped or hat-shaped configuration, defined by a wall 4a, two legs 5a, 6a and outwardly directed front plates 7a, 8a. The cross member 2c is closed by a front-side face plate 9b. The crash box 3c is an extrusion part with attachment portions 24, 25 on the side of the cross member 2c and embraces with the attachment parts 24, 25 the cross member 2c in the joining region 26. The joining region 26 of the cross member 2c has some recessed areas. The crash box 3c and the cross member 2c are joined together by set bolts 27 without prepunching of the components. Glue may additionally be applied in the joining region 26 between the attachment parts 24, 25 and the cross member 2c. In this way, the overall structure can be fixed in place before the set bolts 27 are driven into the components, and the strength of the connection can be increased by the glue application.

The face plate 9b and the cross member 2c are also joined by set bolts 28 which are driven through the face plate 9b and the front plates 7a, 8a.

Figure 7:
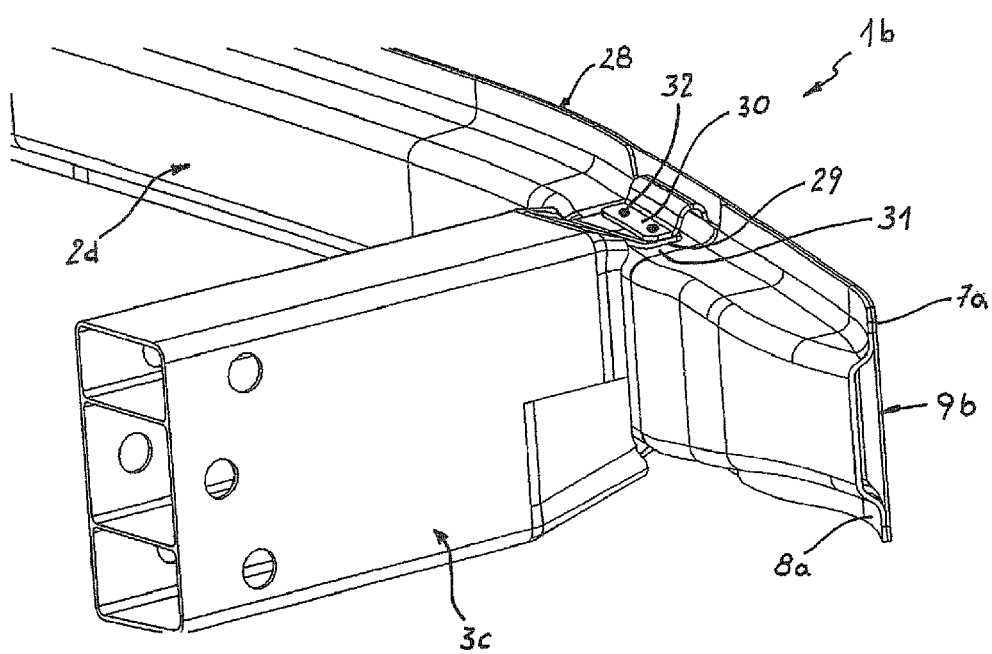
FIG. 7 is a top, rear and side perspective of a detail of yet another embodiment of a bumper according to the present invention.

FIG. 7 shows a further embodiment of a bumper 1b with a cross member 2d and crash boxes 3d. On the side of the cross member 2d, the crash box 3d has attachment parts 29. Formed on the cross member 2d are brackets 30 which are everted from the end surface of the cross member 2d in the direction of the crash boxes 3d. The attachment parts 29 of the crash boxes 3d are received between the brackets 30 and a wall portion 31 of the cross member 2d in the joining region. The mechanical connection is implemented by set bolts 32 which are driven through the brackets 30, the attachment parts 29, and the wall portions 31. The set bolts 32 have a nail-like configuration and are set on one side from outside and driven through the material of the components at high speed, without requiring prepunching of holes.

As a result, a multilayer connection is realized having support and strength characteristics which can further be enhanced by applying glue.

Otherwise, the embodiment of the bumper 1b corresponds to the afore-described embodiment so that corresponding parts are denoted by identical reference numerals.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A bumper for a motor vehicle, comprising:
   a cross member disposed transversely to a side rail of a motor vehicle frame;
   a crash box placed between the cross member and the side rail and having an attachment part;
   a bracket formed on the cross member for connection to the attachment part of the crash box; and
   first set bolts joining the crash box to the cross member in the absence of prepunching,
   wherein the bracket is constructed to extend from an end surface of the cross member in a direction of the crash box, with the attachment part of the crash box being sandwiched between the bracket and a wall portion of the cross member, said set bolts sized to extend through the bracket, the attachment part, and the wall portion.

2. The bumper of claim 1, wherein the cross member and the crash box are made of different materials.

3. The bumper of claim 1, wherein the cross member is made of steel sheet and the crash box is made of an aluminum alloy.

4. The bumper of claim 1, wherein the cross member is composed of different materials.

5. The bumper of claim 1, wherein the cross member has sections of different wall thicknesses.

6. The bumper of claim 1, wherein the crash box and the cross member are additionally secured to one another by gluing.

7. The bumper of claim 1, wherein the cross member and/or the crash box has a surface coating.

8. The bumper of claim 1, wherein the crash box is an extrusion part.

9. The bumper of claim 1, wherein the crash box is constructed in the shape of a sheet metal shell construction.

10. The bumper of claim 1, wherein the cross member has a U-shaped configuration, further comprising a face plate to close the cross member.

11. The bumper of claim 1, wherein the cross member is a roll-formed steel sheet.

12. The bumper of claim 1, further comprising a flange, and second set bolts connecting the flange to a side-rail-proximal end of the crash box in the absence of prepunching.

13. The bumper of claim 12, wherein the crash box and the flange are glued to one another.

* * * * *